US012732435B1

(12) United States Patent

Dacosta et al.

(10) Patent No.: US 12,732,435 B1

(45) Date of Patent: Sep. 8, 2026

(54) NETWORK CONFIGURATION ANALYSIS AND VERIFICATION

(71) Applicant: Amazon Technologies, Inc., Seattle, WA (US)

(72) Inventors: Daniel William Dacosta, Saint Paul, MN (US); Nadia Labai, Redmond, WA (US); Patrick Trentin, Minneapolis, MN (US); Lee Pike, Portland, OR (US); Samuel Bayless, Seattle, WA (US); Syed Mubashir Iqbal, Redmond, WA (US); Nathan Launchbury, Seattle, WA (US); Vaibhav Katkade, San Jose, CA (US); Shridhar Kulkarni, Fremont, CA (US); Devlin Roarke Dunsmore, Bothell, WA (US); Xiyuan Gou, Chicago, IL (US); Baihu Qian, Chicago, IL (US); Bashuman Deb, Aldie, VA (US); Gaurav Sabharwal, Aldie, VA (US); Sandeep Bajaj, San Ramon, CA (US); Xiaoxi Lin, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 18/531,477

(22) Filed: Dec. 6, 2023

(51) Int. Cl.

| | |
|---|---|
| ***H04L 41/40*** | (2022.01) |
| ***H04L 41/0816*** | (2022.01) |
| ***H04L 41/14*** | (2022.01) |
| ***H04L 45/24*** | (2022.01) |

(52) U.S. Cl.
CPC .......... *H04L 41/40* (2022.05); *H04L 41/0816* (2013.01); *H04L 41/145* (2013.01); *H04L 45/24* (2013.01)

(58) Field of Classification Search
None
See application file for complete search history.

(56) References Cited

U.S. PATENT DOCUMENTS

| | | | | |
|---|---|---|---|---|
| 2010/0085878 | A1* | 4/2010 | McDade | H04L 41/0631 370/242 |
| 2011/0051738 | A1* | 3/2011 | Xu | H04L 45/021 370/401 |
| 2022/0060415 | A1* | 2/2022 | Dutta | H04L 45/74 |
| 2023/0026330 | A1* | 1/2023 | Rolando | H04L 63/20 |
| 2023/0099510 | A1* | 3/2023 | Scates | H04L 41/40 370/254 |
| 2023/0110199 | A1* | 4/2023 | Gupta | H04L 12/4641 709/238 |

* cited by examiner

*Primary Examiner* — Fadi Haj Said

(74) *Attorney, Agent, or Firm* — Knobbe, Martens, Olson & Bear, LLP

(57) ABSTRACT

Systems and methods are provided for generating a first model of a network based on a definition of the network, wherein the definition is used to deploy the network; generating a second model of the network based on a current deployment of the network; comparing the first model of the network and the second model of the network; and based on results of comparing the first model of the network and the second model of the network, generating output representing a discrepancy between the definition of the network and the current deployment of the network.

20 Claims, 7 Drawing Sheets

NETWORK CONFIGURATION ANALYSIS AND VERIFICATION

BACKGROUND

Cloud computing is a technology that allows users to access and utilize computing resources, such as compute, storage, databases, networking, and analytics, over the internet. Instead of owning and maintaining physical hardware or software, users can leverage the services provided by cloud providers on a pay-as-you-go basis. This on-demand model offers scalability, flexibility, and cost-effectiveness, enabling individuals and businesses to efficiently deploy and manage applications without the need for extensive upfront investments.

Wide Area Networks (WANs) are computer networks that span multiple geographic locations. WANs are generally made up of connection points and attachments, such as virtual private networks (VPNs) and virtual private clouds (VPCs). WANs can be considered as a collection of Local Area Networks (LANs) that are connected by a collection of physical communication channels. For example, a LAN may be leased lines from telecommunication companies.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
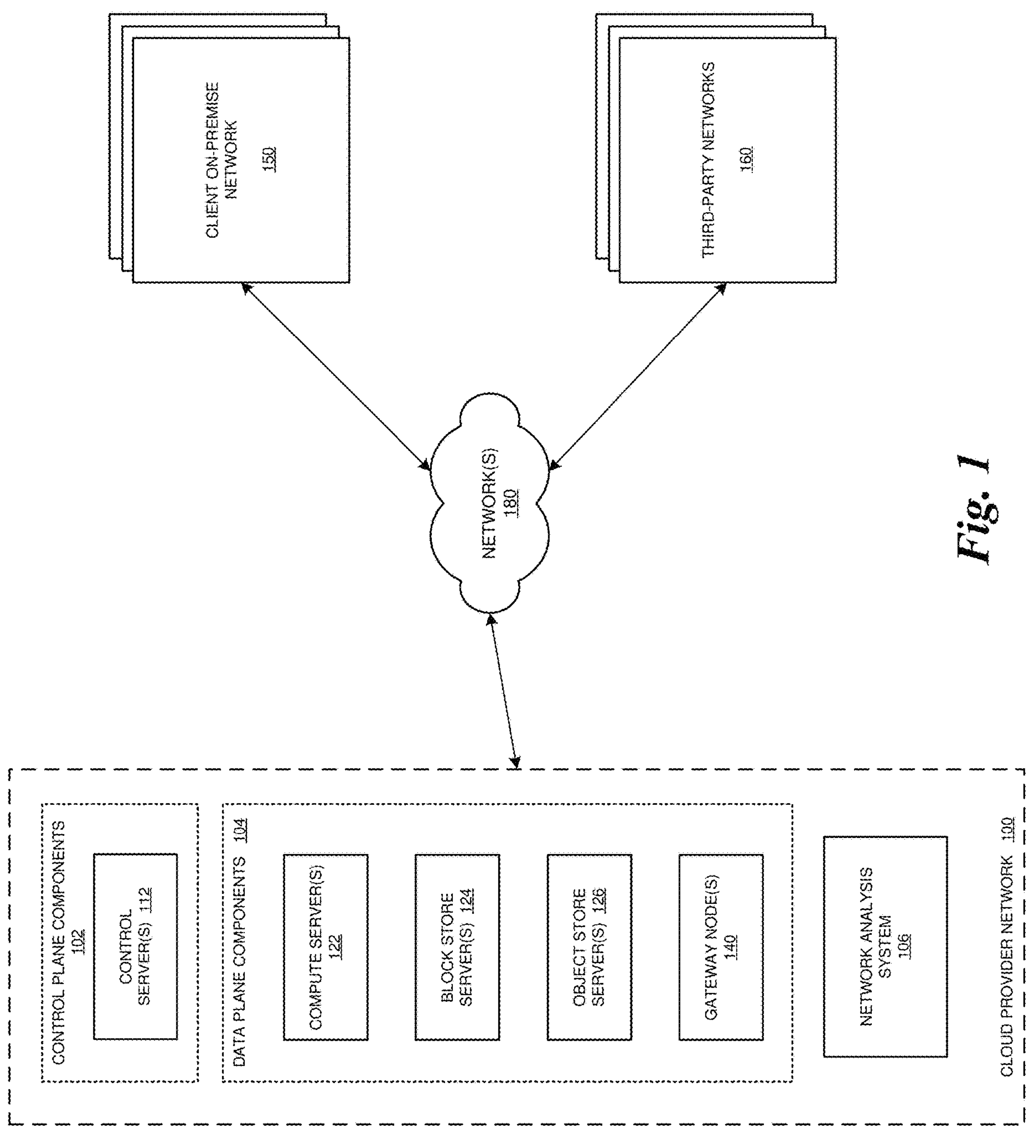
FIG. 1 is a block diagram depicting an illustrative network environment in which cross-region segment management and routing may be implemented according to some embodiments.

Generally described, the present disclosure relates to evaluating networks "as defined" in network policy definitions compared to the networks "as-deployed" from the network policy definitions. The comparison may be performed by a network analysis system using automated analysis of network models. The system may obtain a formal specification of a network policy of a network to be analyzed. The policy defines the rules and other configuration settings that are to be used to make network traffic routing decisions within a network to be deployed based on the policy. The system also obtains a formal specification of the current as-deployed state of the network deployed from such a policy, representing the rules and other configuration settings that are used to make traffic routing decisions within the network. The network analysis system generates a model for each specification: one model of the network as defined by the network policy, and a separate model of the network as currently deployed. An automated analysis is conducted on the two models. The automated analysis can be used to determine discrepancies between the network policy and the deployed network, and to allow users to take action to rectify the discrepancies. Beneficially, automated analysis can allow users (e.g., network administrators) to define and deploy networks, have results of the model analysis presented back to the users in an easy-to-understand form, identify discrepancies between networks as-defined and as-deployed, pose changes to networks using high-level policies, and have those policy changes automatically translated to lower-level implementation operations.

INTRODUCTION

Wide Area Networks ("WANs") are computer networks that span multiple geographic locations. WANs can be considered as a collection of Local Area Networks ("LANs") that are connected by a collection of physical communication channels (e.g., leased lines from telecommunication companies). The distributed nature of WANs makes configuration, modification, and troubleshooting complex. As a result, the telecommunication industry uses technologies referred to as "Software Defined" WANs ("SD-WANs"), which virtualize the use and configuration of standard WAN communication channels. This way, SD-WANs can be centrally controlled and configured using some domain specific language, like a declarative policy.

Some cloud-based network providers provide clients with access to shared, geographically-dispersed network infrastructure over which the clients may implement SD-WANs. Virtualized compute instances, distributed storage systems, virtual private clouds ("VPCs"), and the like may be hosted within the shared network infrastructure. Clients may connect their on-premise networks to the shared network infrastructure of a cloud-based network provider over a direct physical link (e.g., a "direct connection"), through another SD-WAN, through a virtual private network ("VPN") tunnel, or the like. Within the shared network infrastructure, networking and interconnectivity-related features may be provided to meet the requirements of applications being implemented using services hosted in the infrastructure. For example, routers or other gateways in different, distinct geographic regions or other physical and/or logical divisions of the network architecture may be peered such that they share routing data and provide end-to-end routing throughout the shared network infrastructure in a manner that is transparent to clients. However, the complexity of such networks due to their size and physical and/or logical separation into regions, segments, or other divisions may make it difficult or impossible for network administrators or other users to analyze and accurately determine all of the network routing criteria that have been implemented, to determine discrepancies between what is specified in the network policy and the actual infrastructure deployed, and/or to determine why resources are unable to communicate with each other.

An SD-WAN may be configured using network policy data that defines various aspects. For example, the network policy data may define regions encompassed by the SD- WAN, segments that may span multiple regions within the SD-WAN but remain isolated or substantially isolated from each other, the manner in which physically or logically isolated networks (VPCs, VPNs, other SD-WANs, direct connections to on-premise client networks, etc.) are to be attached to segments, and the like. Thus, an SD-WAN may span multiple regions of the cloud provider network, and may include any number of isolated networks that may be hosted within the cloud provider network's physical data centers (e.g., VPCs) or may be physically external to the cloud provider's data centers (e.g., on-premise client networks or third-party networks communicating with the cloud provider network via VPN, SD-WAN, direct connections, etc.). This allows client traffic originating from one endpoint to be transmitted to another endpoint of the deployed SD-WAN regardless of whether one or both endpoints are within or external to the cloud provider network's physical data centers. Moreover, a client may segment traffic of an SD-WAN by defining segments within the network policy data using one or more rules for attachment of isolated networks to the segments. In some embodiments, other rules, attributes, and the like may be specified in the policy data. For example, rules requiring authorization to attach an isolated network to a given segment, rules maintaining isolation of all attachments to a given segment, rules regarding resources to be shared among otherwise isolated attachments or segments, or the like may be defined.

A deployed SD-WAN may not always match what is specified in the network policy from which the SD-WAN is deployed. For example, in order to implement an SD-WAN that a policy specifies, the cloud-based network provider needs to translate the policy to a deployment of physical infrastructure. This translation and deployment can introduce nuances that are specific to the underlying physical WAN infrastructure. Such nuances may not be present in the policy, which is more abstract by nature. As a result, discrepancies can arise. In some cases, there may be an error in the system that deploys the network from the policy (e.g., a programming bug) or there may be routing data entering the network after deployment, which causes a discrepancy.

Some aspects of the present disclosure address some or all of the issues noted above, among others, using automated network analysis to identify discrepancies between the network policy defining an SD-WAN or other network on one hand, and the actual deployed network on the other hand. A user may define a network or a change to a network using network policy data that includes a high-level declarative statement or series of statements (e.g., a statement or series of statements for adding segmentation to an existing network). To deploy the network or network change represented by the policy statement or set of statements, a set of individual lower-level deployment actions, also referred to as implementation operations, may need to be executed.

The network may be defined as a set of logical conditions that can be analyzed using a network analysis engine. A network model may be generated directly from the abstract network definition (e.g., from the series of policy statements, without review of deployed infrastructure) or from evaluation of the concrete, deployed infrastructure (e.g., from route tables deployed to network routing hardware, without review of the policy statements from the network definition). In some embodiments, a network model may be a graphical representation with nodes and edges that represent the routes in the network. For example, a node may be an attachment in the network and the edges may represent the routes between the attachments represented by the nodes. Separate models can be generated for both the network as described in the policy data (also referred to herein as a "network policy model") and as deployed in the actual network infrastructure (also referred to herein as a "deployed network model"). The models may represent the segments of the network, the regions of the network, attachments of the network, along with the routes between the various attachments in the network.

A network analysis system can compare the network policy model and the deployed network model. The comparison may involve determining whether the network policy model represents the same corresponding routes between the nodes as the deployed network model, and vice versa, whether the deployed network model represents the same corresponding routes between the nodes as the network policy model. The comparison may also or alternatively involve determining whether the network policy model excludes the same corresponding routes between the nodes as the deployed network model, and vice versa, whether the deployed network model excludes the same corresponding routes between the nodes as the network policy model. In some embodiments, the network analysis engine may jointly analyze the different models to directly produce a list of any differences in the possible routes.

Using comparisons such as those detailed above, the network analysis system may identify discrepancies between the two models. For example, a discrepancy may be detected when a route exists in one model, but does not exist in the other model, or vice versa. If a discrepancy is found between the two models, the system can modify the deployed network or the definition of the network to account for the discrepancy. The system may also alert a network engineer or other user that a discrepancy exists, the nature of the discrepancy, etc. Then, the user can modify or redeploy the network based on the new definition to resolve the discrepancy.

Various aspects of the disclosure will now be described with regard to certain examples and embodiments, which are intended to illustrate but not limit the disclosure. Although aspects of some embodiments described in the disclosure will focus, for the purpose of illustration, on particular examples of network regions, segments, metadata, models, and analysis techniques, the examples are illustrative only and are not intended to be limiting. In some embodiments, the techniques described herein may be applied to additional or alternative network regions, segments, metadata, models, analysis techniques, and the like. Any feature used in any embodiment described herein may be used in any combination with any other feature, without limitation.

Overview of Example Computing Environment

With reference to an illustrative embodiment, FIG. 1 shows an example computing environment in which features of the present disclosure may be implemented. As shown, the computing environment includes a cloud provider network substrate 100 (also referred to herein as a "cloud provider network," "provider network," "cloud provider system", or simply as a "cloud" for convenience), any number of client on-premise networks 150 (also referred to herein simply as "on-premise networks" for convenience) external to the cloud provider network 100, and any number of third-party networks 160 external to the cloud provider network 100. The cloud provider network 100, on-premise networks 150, and third-party networks 160 may communicate with each over via a network(s) 180, such as an intranet or the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of central processor units ("CPUs") and graphics processing unites ("GPUs"), optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for clients to access cloud infrastructure by allowing clients to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their clients or clients.

The cloud provider network 100 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network 100 can be formed as a number of regions, where a region is a separate geographical area in which the cloud provider clusters data centers. In some embodiments, each region may be implemented as or otherwise treated as a region-based autonomous system ("AS"). Each region can include two or more availability zones connected to one another via a private high-speed network, for example a fiber communication connection. An availability zone ("AZ") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Regions are connected to a global network connecting each region to at least one other region. This global network can be referred to as the cloud provider backbone network in some embodiments. The cloud provider backbone network can be built on a private global, fully redundant, fiber network that is linked via trans-oceanic cables across various oceans and seas. The disclosed techniques can provide clients with a cloud wide area network ("WAN") service that enables them to use the cloud provider backbone network to connect their own on-premise networks (as well as their networks hosted on the cloud provider network) to one another.

Clients can connect to availability zones of the cloud provider network via a publicly accessible network (e.g., the Internet, a cellular communication network). Transit Centers ("TC") are the primary backbone locations linking clients to the cloud provider network, and may be co-located at other network provider facilities (e.g., Internet service providers, telecommunications providers). Each region can operate two TCs for redundancy. The cloud provider network may deliver content from points of presence outside of, but networked with, these regions by way of edge locations and regional edge cache servers (points of presence, or "PoPs"). In some implementations, the cloud provider network can include one or more cellular networks managed and provided by the cloud provider, which can include access points at a client's premise and which can use in-region resources to run various parts of the network. Clients can connect their premises to one another using the disclosed cloud WAN service via TCs, cloud-provided cellular networks, and/or edge locations.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 100, for example it may not be possible to route from a substrate network address to an address in a production network that runs services of the cloud provider, or to a client network that hosts client resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112, etc.) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various clients, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes client resources that are implemented on the cloud provider network 100 (e.g., computing instances, containers, block storage volumes, databases, file storage, etc., as described in greater detail below). Data plane traffic generally includes non-administrative operations such as transferring data to and from the client resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more clients. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a client, e.g., based (at least in part) on input from the client. For example, a client may choose an instance type from a predefined set of instance types. As another example, a client may specify the desired resources of an instance type and/or requirements of a workload that the instance will run, and the instance type selection functionality may select an instance type based on such a specification.

The data plane can also include one or more block store servers 124, which can include persistent storage for storing volumes of client data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Clients can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Clients may use buckets to store objects of a variety of types, including machine images that can be used to launch VMs, and snapshots that can be used to restore volumes.

In some embodiments, the data plane may include one or more gateway nodes 140 configured to implement aspects of the present disclosure for routing data packets through the cloud provider network 100 from sources to destinations. A gateway node 140 may be implemented on a device (e.g., router, server, etc.) or set of devices separate from storage servers and compute servers of the data plane 104. In some embodiments, a gateway node 140 may share one or more virtualized servers with storage or compute servers. In some embodiments, gateway nodes 140 or certain modules or components thereof may be part of the control plane such that they are control plane components 102.

Some clients may desire to use the resources and services of the cloud provider network 100, but for various reasons (e.g., latency in communications with client devices, legal compliance, security, or other reasons) prefer for these resources and services to be provisioned within their own network, for example in a client on-premise network 150. A piece of the cloud provider network—referred to herein as a "provider substrate extension" or PSE—may be provisioned within the client on-premise network 150. A client may access their PSE via the cloud provider network 100 or their own network, and may use the same APIs to create and manage resources in the PSE as they would use to create and manage resources in the cloud provider network 100 region.

The PSE may be pre-configured, e.g., by the provider network operator, with the appropriate combination of hardware with software and/or firmware elements to support various types of computing-related resources, and to do so in a manner that mirrors the experience of using the cloud provider network 100. For example, one or more PSE servers can be provisioned by the cloud provider within the client on-premise network 150. As described above, the cloud provider network 100 may offer a set of predefined instance types, each having varying types and quantities of underlying hardware resources. Each instance type may also be offered in various sizes. In order to enable clients to continue using the same instance types and sizes in their PSE as they do in the cloud provider network 100 region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 100 region and PSE.

In the manner described above, a PSE forms an edge location, in that it provides the resources and services of the cloud provider network outside of a traditional cloud provider data center and closer to client devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a client workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a client or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the client who owns the premises (and any other accounts allowed by the client). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with client resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to client devices and/or workloads.

The cloud provider network 100 may also contain a network analysis system 106. The network analysis system 106 is configured to implement aspects of the present disclosure of analyzing and determining discrepancies in the cloud provider network 100 between the network policy and the network as deployed. The network analysis system 106 may generate and/or analyze models of the network to identify the discrepancies between the network policy and the network as deployed. A network analysis system 106 may be implemented on a device (e.g., router, server, etc.) or set of devices and is running on a computing server.

Figure 2:
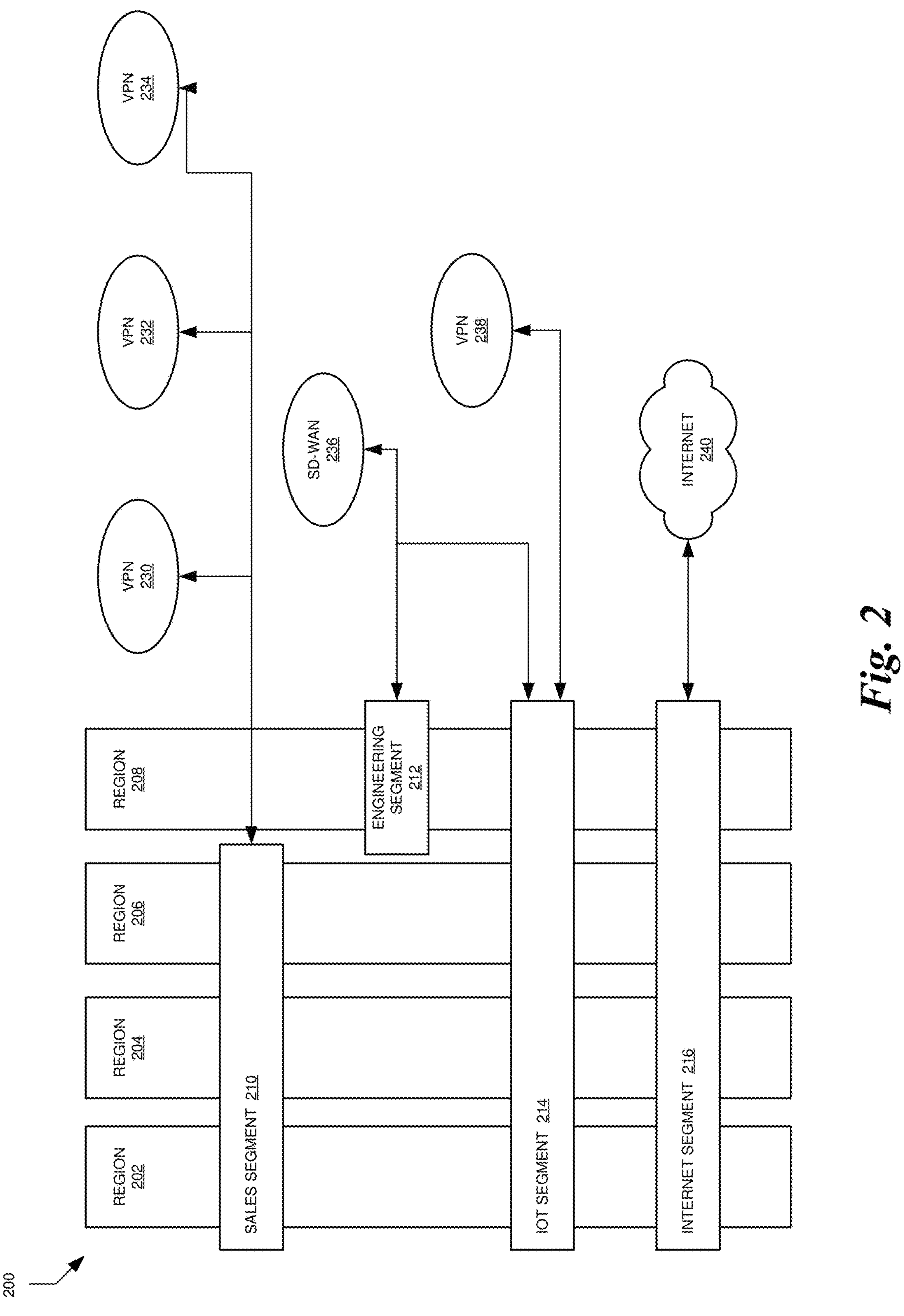
FIG. 2 is a block diagram of an illustrative virtual private cloud-based wide area network in which multiple segments have been provisioned according to some embodiments.

FIG. 2 illustrates an example SD-WAN 200 implemented at least in part using hardware and services of the cloud provider network 100. For example, the SD-WAN 200 may be implemented using a cloud WAN service of the cloud provider network 100. Such an SD-WAN 200 may also be referred to more generally as a WAN, or simply as a network.

The SD-WAN 200 is implemented as "global" WAN that encompasses multiple regions of the cloud provider network 100 and uses the cloud provider network 100 infrastructure to transport data between client on-premise networks 150 and/or third-party networks 160. In some embodiments, the SD-WAN does not necessarily use other compute or storage resources of the cloud provider network 100. For example, this SD-WAN may have no connectivity to any VPC hosted within the cloud provider network 100. Rather, it uses the cloud provider network 100 as transport between client on-premise networks 150 and for internet access.

The example SD-WAN 200 encompasses multiple regions of the cloud provider network 100: a first region 202, a second region 204, a third region 206, and a fourth region 208. The regions may correspond to different geographic regions, such as different neighborhoods, cities, counties, states, provinces, countries, and/or continents. In addition, the SD-WAN 200 includes four segments: a sales segment 210, an engineering segment 212, an internet-of-thing ("IoT") segment 214, an internet segment 216.

There are several isolated networks attached to the segments of the SD-WAN 200, including: VPN 230, VPN 232, and VPN 234 attached to sales segment 210 and providing tunnels to/from different client on-premise networks; SD-WAN 236 attached to engineering segment 212 and IoT segment 214 and providing access for one or more client on-premise networks; and VPN 238 attached to IoT segment 214 and providing access for one or more client on-premise networks. Table 1 below includes an example of policy data that may be used to define and implement a SD-WAN such as SD-WAN 200.

TABLE 1

```
{
  <core network configuration data>
  "segments": [
  {"name": "sales"},
  {"name": "testing"},
  {
    "name": "iot",
    "isolate-attachments": true
  } ,
  {"name": "internet"},
  {"name": "engineering"}
  ],
  "segment-actions": [
  {
    "action": "share",
    "mode": "attachment-route",
    "segment": "internet",
    "share-with": ["sales"]
  },
  {
    "action": "share",
    "mode": "attachment-route",
    "segment": "iot",
    "share-with": ["engineering"]
  },
  ],
  "attachment-policies": [
  {
    "rule-number": 1000,
    "conditions": [
      {
      "type": "tag-exists",
      "key": "Assign-to"
      }
  ],
  "action": {
    "association-method": "tag",
    "tag-value-of-key": "Assign-to"
    }
  }
  ]
}
```

In this example, computing resources in an on-premise network mapped to VPN 230 or 232, attached to sales segment 210, are permitted to access the internet due to the first "share" action which results in a sharing of routes between the segments. IoT segment 214 is under security scrutiny, so attachments within IOT segment 214 cannot reach each other (e.g., SD-WAN 236 cannot communicate with VPN 238 via IoT segment 214). However, SD-WAN 236 may have been deployed to the on-premise engineering networks and parts of the on-premise IoT network. Engineers may require direct access to the on-premise IoT network, which in this example is implemented using a mixture of VPN 238 and SD-WAN 236. In some cases, the SD-WAN 236 will take a direct route between on-premise sites. In other cases, such as when traffic is to cross the on-premise engineering network and on-premise IoT network, the SD-WAN 236 may use the SD-WAN 200 as transport.

To reduce effort, the policy data uses the "Assign-to" tag to define which segment new attachments should be mapped to. For example, any time an attachment includes a tag "Assign-to: sales" the attachment will be automatically mapped to the sales segment 210. Because no value is provided for a "require-attachment-acceptance" attribute, the default value will be used thereby requiring all attachments to be approved.

Example Network Models

Figure 3A:
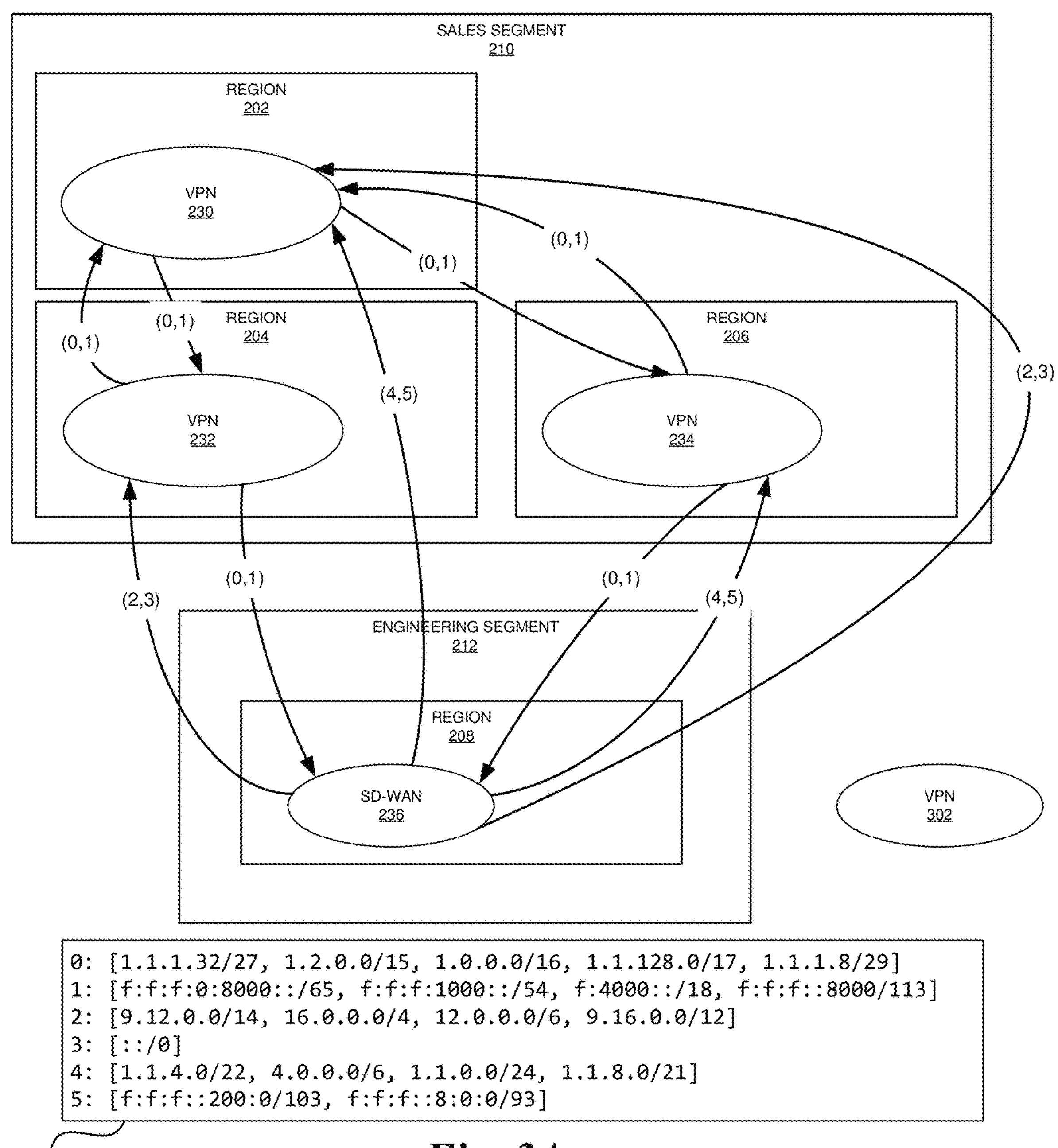
FIG. 3A is a graphical representation of a software defined wide area network with segments, regions, attachments, and shared routes based on the network definition according to some embodiments.

FIG. 3A illustrates a network policy model 300 as a graphical representation of a network with segments, regions, attachments, and shared routes based on a network definition (e.g., policy data) according to some embodiments. The network policy model 300 may illustrate the connectivity within and among regions, attachments, and other physical or logical components of a network based on the network definition. In some embodiments, the network analysis system 106 may generate the network policy model 300 by parsing the policy data (such as policy data shown in Table 1 above) and applying programming rules to create nodes and edges representing the connectivity within the network.

The network policy model 300 represents segments, which may or may not span regions and comprise attachments, and which may or may not be interconnected. For example, within the network policy model 300 are a sales segment 210 and an engineering segment 212. The sales segment 210 spans three regions: region 202, region 204, and region 206. Region 202 includes an attachment, VPN 230, region 204 includes an attachment, VPN 323, and region 206 includes attachment VPN 234. The engineering segment 212 spans region 208, which includes an attachment, SD-WAN 236. The network policy model 300 also includes another attachment, VPN 302. VPN 302 is not part of any segment.

The network policy model 300 also includes edges that represent routes between the attachments. The edges on the network policy model 300 are labeled with a tuple (x, y). The tuples represent the available network addresses (e.g., IP addresses) for routes between the attachments. In some embodiments, the x and y in the tuples correspond to different groups of IP addresses, such as different classless inter-domain routing (CIDR) ranges from a list of available IP addresses 310. For example, in the list of available IP addresses 310, set 0 comprises IPv4 addresses in CIDR ranges 1.1.1.32/27, 1.2.0.0/15, 1.0.0.0/16, 1.1.128.0/17, and 1.1.1.8/29. In another example, set 1 comprises IPv6 addresses in CIDR ranges f:f:f:0:8000::/65, f:f:f:1000::/54, f:4000::118, and f:f:f::8000/113. In some embodiments, a tuple can include one or more sets of each type of address, such as one IPv4 set and one IPv6 set. In other embodiments, a tuple can include one or more sets of a single type of address, such as sets of only IPv4 addresses.

In the illustrated example, from SD-WAN 236 to VPN 234, there is an edge which is labeled with the tuple (2, 3), which indicates that traffic from SD-WAN 236 is permitted be routed to VPN 234 provided that the destination address is in the corresponding sets 2 or 3 of list of available IP addresses 310. As another example, from VPN 234 to VPN 230, there is an edge label with the tuple (0, 1), which indicates that traffic from VPN 234 is permitted be routed to VPN 230 provided that the destination address is in the corresponding sets 0 or 1 of the list of available IP addresses 310. On the other hand, there is no edge between VPN 302 and any other attachment, indicating that there should be no routes for communication between VPN 302 and either the sales segment 210 or the engineering segment 212.

In other embodiments, the routes between attachments may be bidirectional. With bidirectional routes, the available network addresses (e.g., IP addresses) for routes between the attachments are the same between the two attachments, regardless of which direction the route is going. For example, with bidirectional routes, the list of available network addresses is the same for routes going from VPN 232 to SD-WAN 236 as the list of available network addresses for routes going from SD-WAN 236 to VPN 232. Although the network policy model 300 depicts unidirectional routes, this is not meant to be limiting.

Figure 3B:
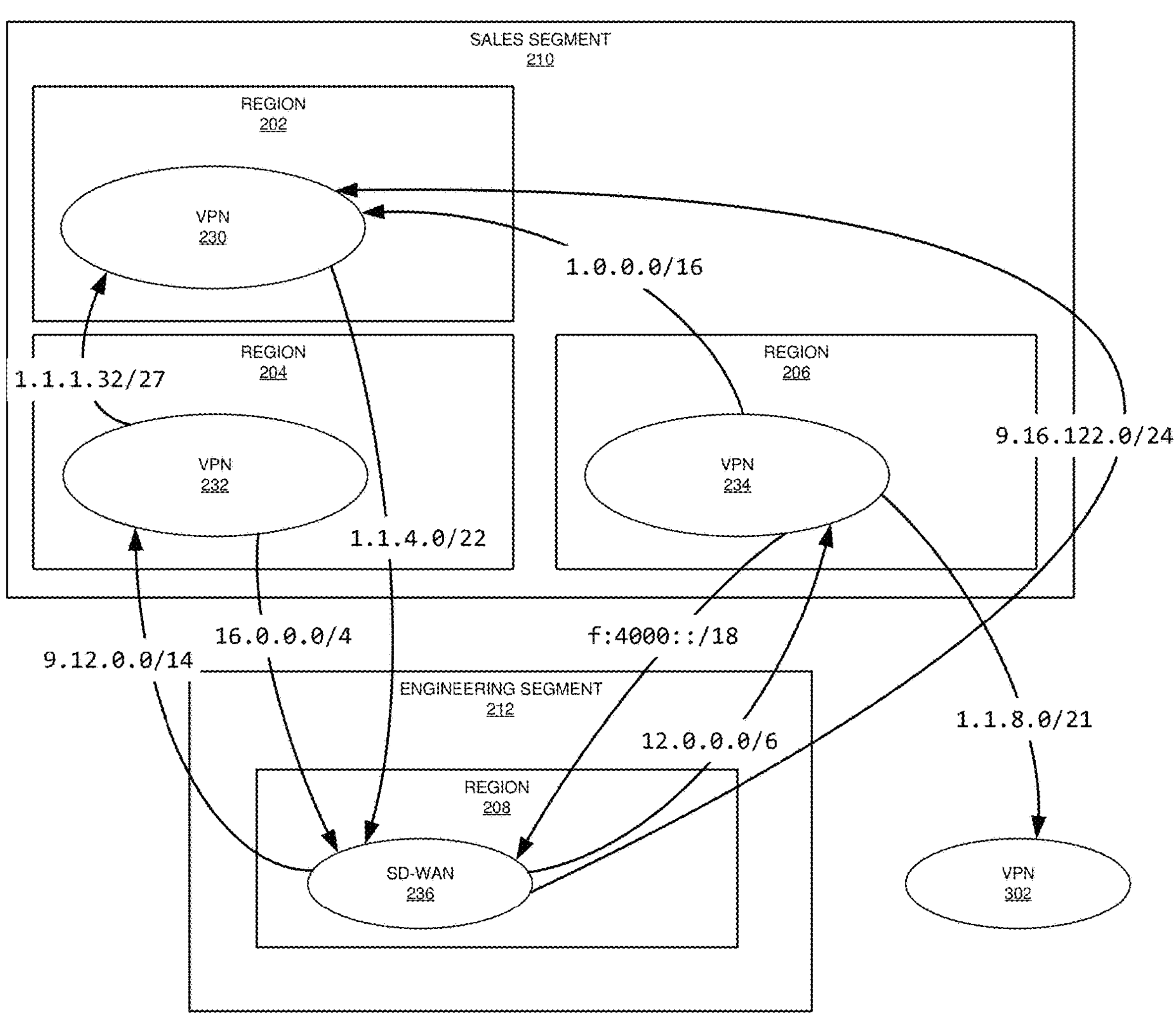
FIG. 3B is a graphical representation of a software defined wide area network with segments, regions, attachments, and shared routes as deployed on the network according to some embodiments.

FIG. 3B is a deployed network model 301 that is a graphical representation of a network with segments, regions, attachments, and shared routes as deployed within cloud provider network infostructure, such as cloud provider network 100, according to some embodiments. The deployed network model 301 may illustrate the connectivity within and among regions, attachments, and other physical or logical components of a network that has been deployed based on policy data, such as the same policy data from which the network policy model 300 shown in FIG. 3A is generated.

The deployed network model 301 represents segments, which may or may not span regions and comprise attachments, and which may or may not be interconnected. For example, within the deployed network model 301 there is a sales segment 210 and an engineering segment 212, as depicted in FIG. 3A. The sales segment 210 spans three regions: region 202, region 204, and region 206. Region 202 includes an attachment, VPN 230, region 204 includes an attachment, VPN 323, and region 206 includes attachment VPN 234. The engineering segment 212 spans region 208, which includes an attachment, SD-WAN 236. There is also another attachment in the deployed network model 301, VPN 302. VPN 302 is not part of any segment.

The deployed network model 301 also includes edges which represent routes between the attachments. The directed edges on the deployed network model 301 are labeled with permitted destination IP addresses for communications between the attachments. For example, the destination IP addresses on the directed edge from VPN 234 to VPN 302 are in the CIDR range 1.1.8.0/21 and the destination IP addresses on the directed edge from VPN 232 to VPN 230 are in the CIDR range 1.1.1.32/27. As another example, the destination IP address on the directed edge from SD-WAN 236 to VPN 230 is 9.16.122.0/24.

The network analysis system 106 may compare the network policy model 300 and deployed network model 301 to determine discrepancies. For example, in the network policy model 300 there is no edge between VPN 234 and VPN 302. However, in the deployed network model 301 there is an edge between VPN 234 and VPN 302, indicating destination IP addresses in the CIDR range 1.1.8.0/21. This route is an example of a discrepancy between the network definition and the as-deployed network, where the network definition does not have a route that is present in the as-deployed network.

As another example of a discrepancy, in the network policy model 300 there is a directed edge from VPN 230 to VPN 232, with available IP addresses in sets 0 or 1 of the list of available IP addresses 310. However, in the deployed network model 301, there is no such edge in the deployed network model 301. Comparing the two graphs, the system can identify that there is discrepancy with respect to this edge, where the as-deployed network is missing a route that is specified in the policy.

As a further example of a discrepancy, in the network policy model 300 there is a directed edge from VPN 232 to SD-WAN 236 with IP addresses in sets 0 or 1 of the list of available IP addresses 310. However, in the deployed network model 301, the directed edge from VPN 232 to SD-WAN 236 is labeled with an IP address not in set 0 or set 1, but in set 2: 16.0.0.0/4. Comparing the two graphs, the system can identify that there is discrepancy with respect to this edge, where the both the network definition and the as-deployed network include routes between the two attachments, but the route in the as-deployed network is not within the CIDR range specified in the network definition.

Analysis of Network Models

Figure 4:
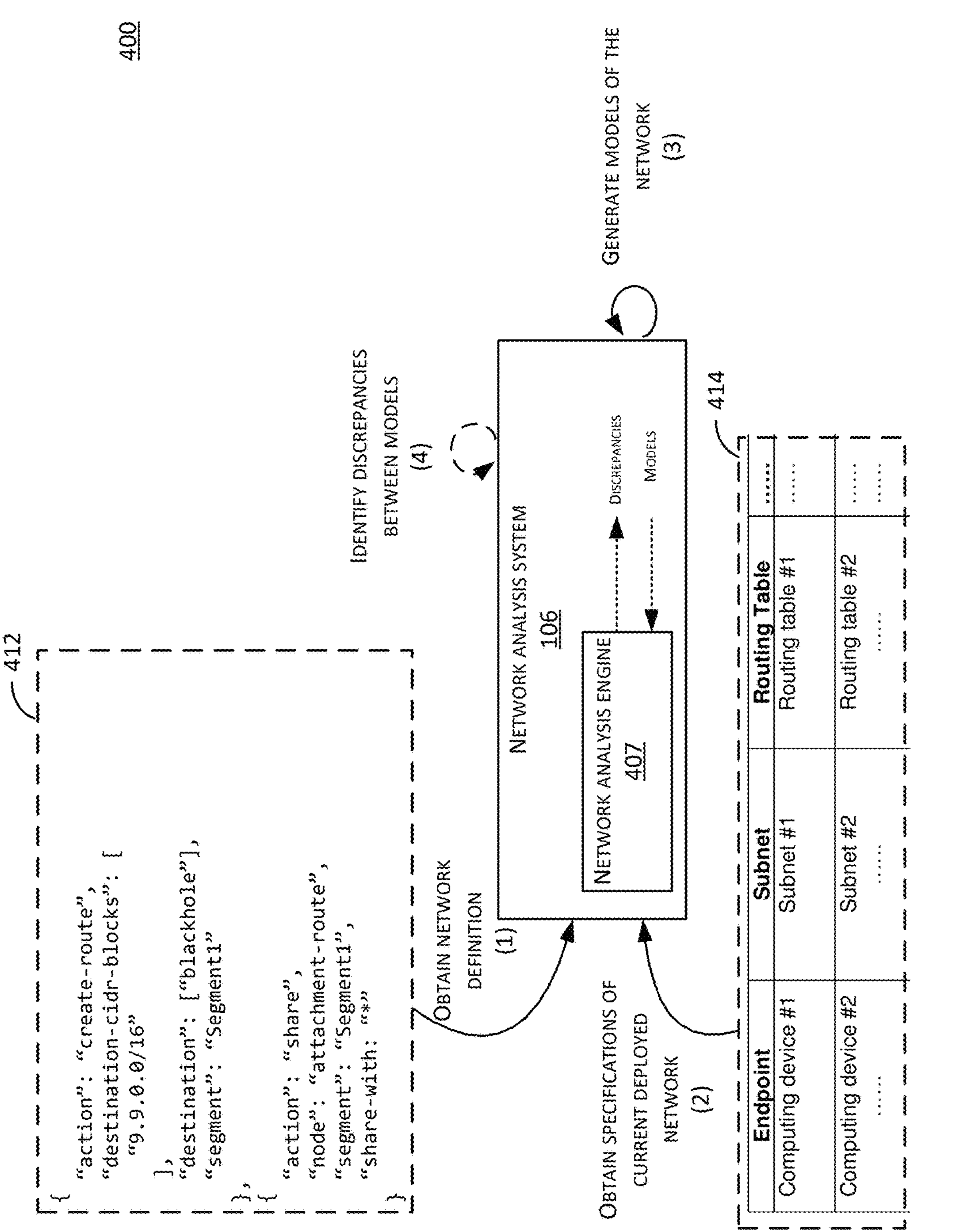
FIG. 4 depicts an example workflow for identifying discrepancies in an example networked environment.

FIG. 4 depicts an example workflow 400 for a network analysis system 106 identifying discrepancies in an example networked environment. The network analysis system 106 may periodically generate and analyze the model of the network definition and the model of the currently deployed network and identify discrepancies between the models.

In order to analyze the two models of the network, as shown in FIG. 4 at (1), a network analysis engine 407 or some other module or component of the network analysis system 106 obtains the network definition 412 corresponding to a particular network policy. The network definition 412 may provide semantics of the components of the network architecture (e.g., the network definition may illustrate how components are connected). For example, the network definition 412 may illustrate how a route table directs traffic from an availability zone, the order in which a firewall applies routing rules, or how load balancers balance network traffic. The network definition 412 may illustrate how each device (e.g., each routing device) of the network architecture operates. In some embodiments, the network definition 412 may include more or less information. For example, the network definition 412 may include universally applicable information that covers multiple network architectures. In other embodiments, the network definition 412 may be specific to a particular network architecture. In the example of FIG. 4, the network definition 412 includes (but is not necessarily limited to) a policy which specifies the routes available to other attachments from Segment1 using certain destination CIDR blocks. The policy may indicate a destination and a segment. In some embodiments, a certain type of policy may have different semantics in different situations or different network architectures.

At (2), the network analysis engine 407 or some other module or component of the network analysis system 106 obtains the specifications 414 of the current deployed network corresponding to a particular network architecture (e.g., a snapshot of the deployed network). The specifications 414 may describe the topology and/or details of the network. For example, the specifications 414 may describe the computing devices, routing devices, availability zones, route tables, etc. that are associated with a specific network architecture. In the example of FIG. 4, the specifications 414 includes endpoint "computing device #1" and "computing device #2" that are each associated with a corresponding subnet "subnet #1" and "subnet #2" and a corresponding routing table "routing table #1" and "routing table #2." Each endpoint may indicate a source or destination of network traffic. Each subnet may indicate an availability zone of the endpoint. Each routing table may indicate how traffic may travel to a particular endpoint. For example, routing table #1 may indicate that computing device #1 can route traffic to computing device #2 through network device #1 and then through instance #1 of the stateful network routing service and then through one or more firewalls before being transmitted to the computing device #2. Each endpoint may correspond to such a routing table such that the network analysis system 106 can determine the set of possible routes to and/or from the endpoint.

At (3), the network analysis engine 407 or some other module or component of the network analysis system 106 generates models of the network based on the network definition 412 and the specifications 414. The network analysis system 106 may generate a first model based on the network definition 412 and a second model based on the network specifications 414. In some embodiments, the network analysis engine 407 may generate more, less or different models. The network analysis engine 407 may determine or obtain the models based on the network definition 412 and the specifications 414 and may analyze a particular model of the network in order to illustrate how network traffic may travel between multiple endpoints. In some embodiments, the network analysis engine 407 may construct the models of the network based on the network definition 412 and the specifications 414. Therefore, the network analysis system 106 may use the network analysis engine to generate the models.

At (4), the network analysis engine 407 identifies discrepancies between the model of the network definition and the model of the currently deployed network. The network analysis engine 407 may analyze the first and second models of the network in order to determine how traffic can travel to/from a particular endpoint in the network definition 412 and specification 414, which may indicate a discrepancy if they do not match. The way in which traffic can travel to and/or from a particular endpoint may indicate a possible route of the network traffic. The set of routes may correspond to a particular route to an endpoint associated with the network architecture. Each endpoint may correspond to one or more possible routes. In some embodiments, a set of possible routes may correspond to multiple endpoints. Therefore, the network analysis engine 407 can compare the first model with the second model to determine if the sets of routes are represented in both models. In some embodiments, the network analysis engine 407 may provide an indication to a user of the differences in routes between the first model and the second model.

Figure 5:
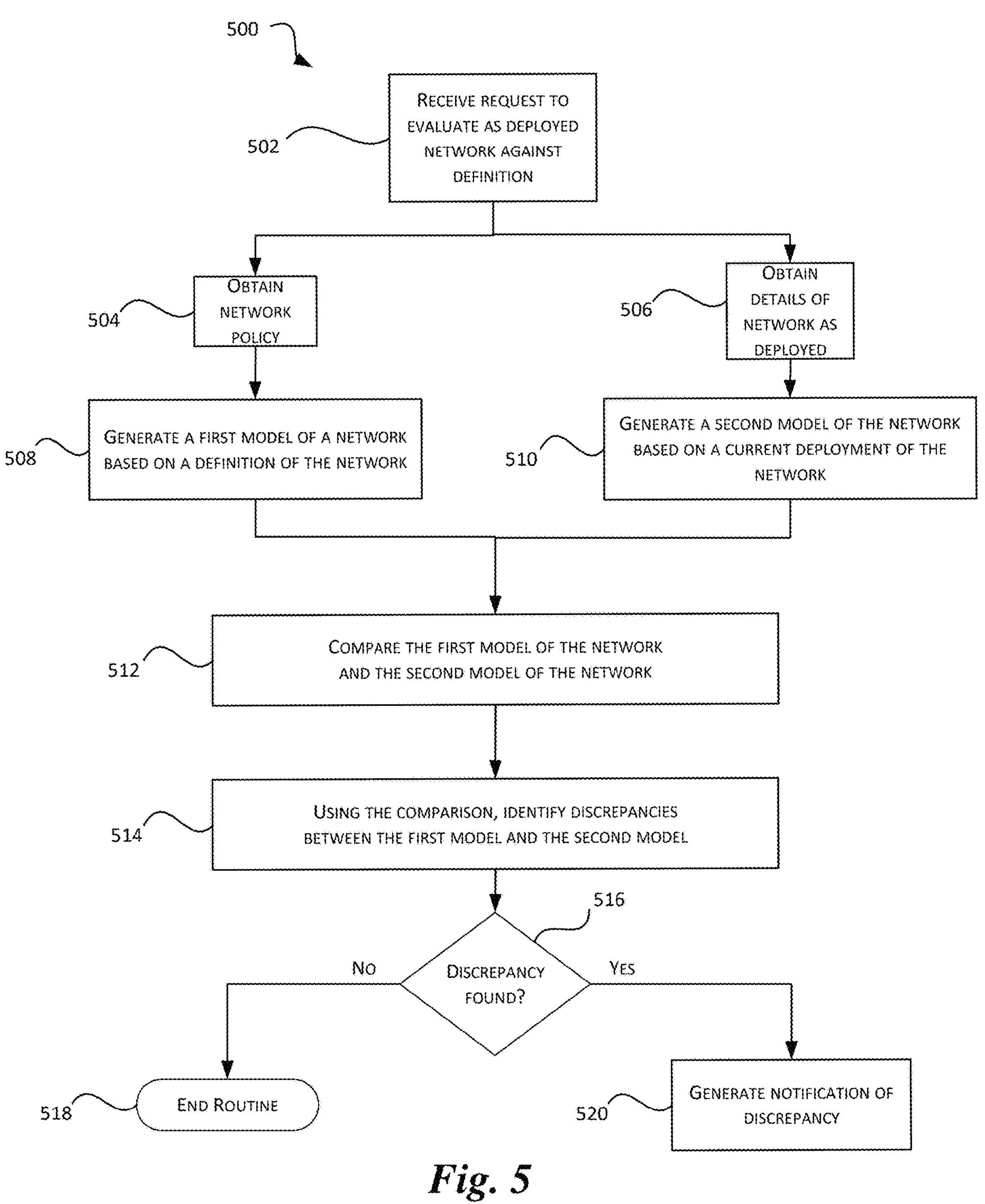
FIG. 5 is a flowchart of an example routine for identifying discrepancies in an example networked environment.

FIG. 5 is a flowchart of an illustrative process 500 for identifying discrepancies in an example networked environment. The process 500 includes identifying discrepancies between a network definition and an as-deployed network using two models of the network architecture. By using these models, a computing device may more efficiently identify discrepancies between a network definition and the as-deployed network.

The process 500 begins at block 502 by receiving a request to evaluate the as-deployed network against the network definition in order to check the as-deployed network for discrepancies against the network definition from which the network was deployed. The process 500 may begin automatically upon initiating a device (e.g., a network analysis system 106), or may be initiated by a client or end-user on an ad hoc basis. The client or end-user may use an interactive system to initiate the process 500. For example, a client or end-user may request the evaluation of the as-deployed network against the definition to evaluate the status of the network when desired by the client or end-user using the interactive system. The process 500 may also be initiated automatically based on a routine schedule (e.g., every hour, day, or week, etc.), in response to a triggering event, or both. For example, a routine schedule may set the process 500 to automatically be performed every week and therefore, the process 500 may be performed every week according to the set schedule. Additionally, a triggering event, for example, may be a network definition update event, an added attachment event, etc., where an event occurrence in the network triggers initiation of the process 500.

The process 500 may be embodied in a set of executable program instructions stored on a computer-readable medium, such as one or more disk drives of a computing system of a node or a server. When the process 500 is initiated, the executable program instructions can be loaded into memory, such as random access memory ("RAM"), and executed by one or more processors of a computing system, such as the network analysis system 106 shown in FIG. 6.

At block 504, a computing device executing the process 500 (e.g., the network analysis system 106) obtains the network policy of the network to be evaluated. The network policy consists of the current abstract definition of the network. In some embodiments, policy data defines the regions in which the network is deployed, the regions spanned by specific segments, isolated networks attached to the segments and associated with specific accounts, etc. For example, the policy data may comprise specifications describing the connectivity between different parts of the network. Additional examples of policy data are described elsewhere herein.

At block 508, a first model of the network based on the network policy (e.g., the current abstract definition of the network) is generated. The first model may represent a first set of routes in the network. In some embodiments, the first model (and/or any additional models) of the network is generated by the network analysis system 106. In other embodiments, the first model (and/or any additional models) of the network is generated by a different computing device or system, and the network analysis system 106 obtains the model(s) of the network directly or indirectly from the other computing device or system.

At block 506, a computing device executing the process 500 (e.g., the network analysis system 106) obtains a snapshot or other formal specifications of the network to be evaluated, as that network has been deployed (e.g., on infrastructure of the cloud provider network 100 based on policy data described above). In some embodiments, the computing device executing the process 500 may obtain the snapshot or other formal specification, such as a set of routing rules for the network, in response to an API call to a control plane component of the cloud provider network 100 to obtain control plane information about the deployed network. The snapshot or other specifications of as-deployed network consists of the semantics of the configuration and the network architecture existing in the as-deployed network. For example, the specifications may describe the connectivity between different parts of the currently deployed network.

At block 510 a second model of the network based on the current deployment of the network is generated. The second model may further be based on a snapshot and/or a formal specification of the network according to the network policy obtained at block 506. The second model may illustrate a second set of routes in the network. In some embodiments, the second model (and/or any additional models) of the network is generated by the network analysis system 106. For example, the network analysis engine 407 may combine the formal specification and the snapshot in order to generate a model that represents the set of routes associated with the deployed network, or from which the set of routes associated with the deployed network can be derived. In other embodiments, the second model (and/or any additional models) of the network is generated by a different computing device or system, and the network analysis system 106 obtains the model(s) of the network directly or indirectly from the other computing device or system.

Although FIG. 5 illustrates blocks 504 and 508 being performed in parallel (e.g., concurrently) with blocks 506 and 510 respectively, the illustration is provided by way of example only, and is not intended to be limiting or required. In some embodiments, blocks 504, 506, 508, and 510 may be performed serially (e.g., one after the other), asynchronously, or in some other manner. For example, blocks 504 and 506 and blocks 508 and 510 may be performed in various sequences. In one example, block 504 is performed first, followed by block 506, followed by block 508, and then block 510. Alternatively, block 504 is performed first, followed by block 508, followed by block 506, and then block 510, etc.

At block 512, the computing device compares the first model of the network and the second model of the network. Comparing the first model and the second model may include comparing a first set of routes corresponding to the first model and a second set of routes corresponding to the second model. The first set of routes and the second set of routes may be compared to determine if the sets of routes share the same routes. For example, the routes may correspond to the manner in which traffic is routed. Comparing the first model and the second model may include identifying routing criteria included in the first model and excluded from the second model and/or vice versa, routing criteria included in the second model and excluded from the first model. In some embodiments, where the models are directed graphs such as those illustrated in FIGS. 3A and 3B, the models may be compared node-by-node and/or edge-by-edge to identify discrepancies. Furthermore, comparing the first model and the second model may include comparing which segments, regions, and attachments are represented in the first model compared to the second model and comparing which regions span the segments, which attachments are included in the regions, and so on.

At block 514, the network analysis system 106 identifies discrepancies between the first model and the second model. Identifying the one or more discrepancies may include identifying a route included in the first model and excluded from the second model or identifying a route included in the second model and excluded from the first model. Therefore, the network analysis system 106 identifies the one or more discrepancies. Examples of discrepancies are described elsewhere herein.

At decision block 516, the network analysis system 106 or some other system may determine whether a discrepancy has been found. If so, the process 500 proceeds to block 520. Otherwise, the process 500 may terminate at block 518.

At block 520, the network analysis system 106 generates a notification of the discrepancy. The notification may inform the user that a discrepancy was found and may include further information about the nature of the discrepancy. The notification may also include information regarding how the user can resolve the discrepancy. The notification may also allow the user to take steps to resolve the discrepancy, such as redeploying the network or modifying the network policy.

Example Network Analysis System

Figure 6:
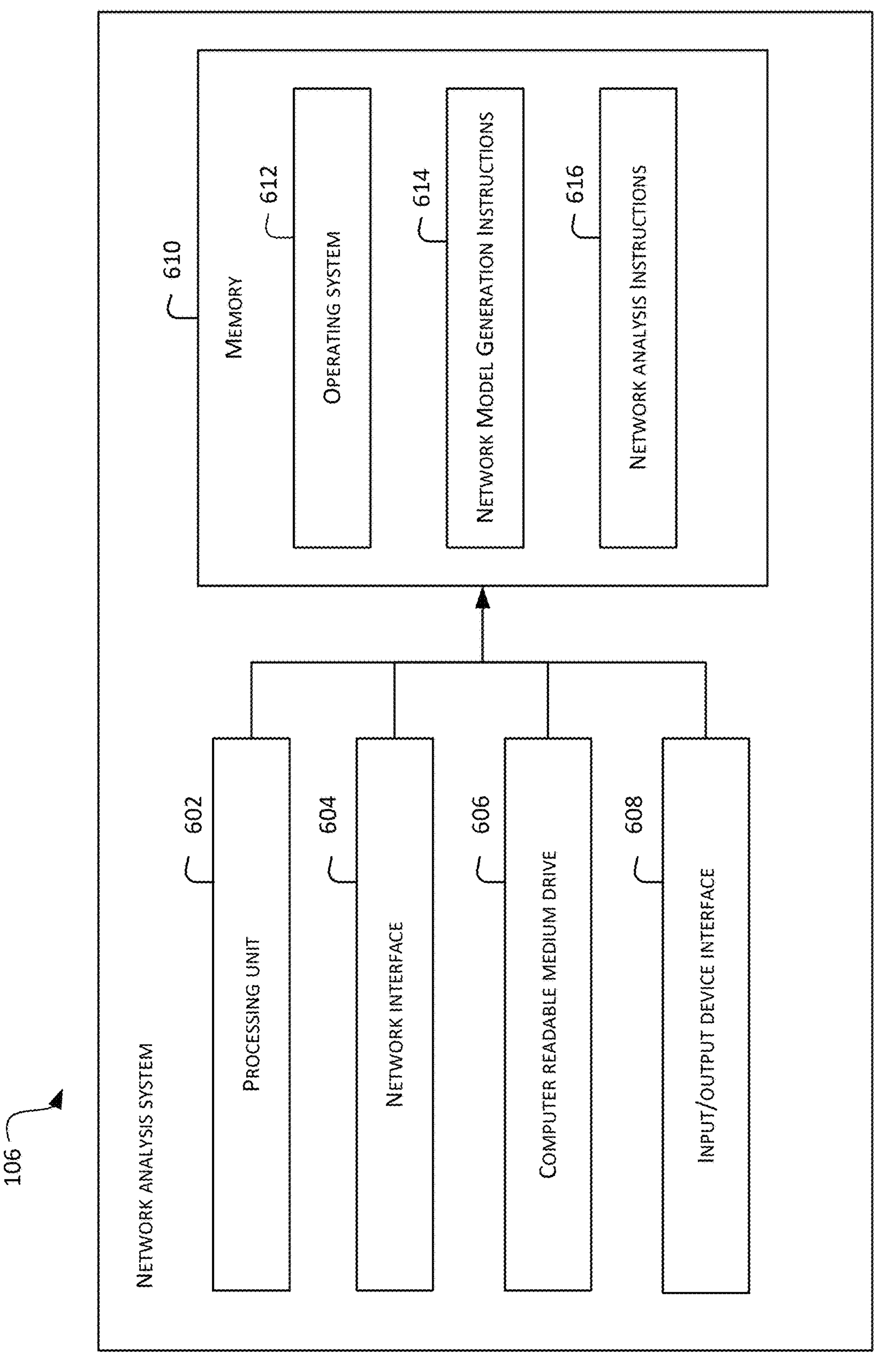
FIG. 6 shows an example computing device that may be used to implement aspects of the present disclosure.

FIG. 6 illustrates an example network analysis system 106 configured to execute the processes and implement the features described above. In some embodiments, the network analysis system 106 may include: one or more computer processors 602, such as physical central processing units ("CPUs"); one or more network interfaces 604, such as a network interface card ("NIC"); one or more computer readable medium drives 606, such as a high density disk ("HDD"), a solid state drive ("SSD"), flash drives, and/or other persistent non-transitory computer-readable media; an input/output device interface 608, such as an input output ("IO") interface in communication with one or more microphones; and one or more computer readable memories 610, such as RAM and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the network analysis system 106. The computer readable memory 610 can further include computer program instructions and other information for implementing aspects of the present disclosure. For example, in one embodiment, the computer readable memory 610 may include network model generation instructions 614. As another example, the computer-readable memory 610 may include the network analysis instructions 616. In some embodiments, multiple network analysis systems 106 may communicate with each other via their respective network interfaces 604, and can implement multiple sessions each session with a corresponding connection parameter (e.g., network analysis system 106 may execute one or more separate instances of the processes 500), in parallel (e.g., each network analysis system 106 may execute a portion of a single instance of a process 500), etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electrically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

a cloud provider network comprising a plurality of endpoints and a plurality of routers, wherein the plurality of routers are configured to route network traffic between the plurality of endpoints; and a network analysis system comprising one or more computing devices, each computing device comprising one or more computer processors and computer-readable memory storing executable instructions, wherein the network analysis system is programmed to at least:

obtain policy data from which a software defined wide area network is to be deployed on the cloud provider network, wherein the software defined wide area network connects two or more client on-premise networks to each other via the cloud provider network;

determine, using the policy data, a plurality of implementation operations to be performed to deploy the software defined wide area network;

deploy the software defined wide area network in the cloud provider network using the plurality of implementation operations;

generate a first model of the software defined wide area network based on the policy data without review of the software defined wide area network as deployed, wherein the first model is a first graphical representation of the software defined wide area network as specified in the policy data, and wherein the first graphical representation exhibits a first set routes between endpoints of the plurality of endpoints as specified in the policy data;

generate a second model of the software defined wide area network, wherein the second model is a second graphical representation of the software defined wide area network as deployed in the cloud provider network, and wherein the second graphical representation exhibits a second set of routes between endpoints of the plurality of endpoints as deployed in the cloud provider network;

compare the first model to the second model to determine whether the first model includes the second set of routes as deployed in the cloud provider network from the second model; and using the comparison of the first model to the second model, identify a discrepancy between the first model and the second model.

2. The system of claim 1, wherein the first graphical representation of the software defined wide area network for the first model further comprises:

a set of segments of the software defined wide area network, a set of attachments of the software defined wide area network, wherein individual attachments of the set of attachments are assigned to respective segments of the set of segments; and a set of routes between two or more attachments of the software defined wide area network.

3. The system of claim 1, wherein the second graphical representation of the software defined wide area network for the second model further comprises:

a set of segments of the software defined wide area network, a set of attachments of the software defined wide area network, wherein individual attachments of the set of attachments are assigned to respective segments of the set of segments; and a set of routes between two or more attachments of the software defined wide area network.

4. A computer-implemented method comprising:

under control of a computing system, the computing system comprising memory and one or more computer processors configured to execute specific instructions:

generating a first model of a network based on policy data from which the network has been deployed, wherein policy data represents a definition of the network, and wherein the first model is generated without review of the network as deployed;

generating a second model of the network based on a current deployment of the network;

comparing the first model of the network and the second model of the network; and based on results of comparing the first model of the network and the second model of the network, generating output representing a discrepancy between the definition of the network and the current deployment of the network.

5. The computer-implemented method of claim 4, further comprising:

modifying, based on the discrepancy, the definition of the network to generate a modified definition of the network; and modifying the current deployment of the network based on the modified definition.

6. The computer-implemented method of claim 4, further comprising:

modifying, based on the discrepancy, the definition of the network to generate a modified definition of the network; and redeploying the network based on the modified definition.

7. The computer-implemented method of claim 4, further comprising modifying, based on the discrepancy, the current deployment of the network to generate a modified deployment of the network.

8. The computer-implemented method of claim 4, wherein generating the first model comprises generating a first graphical representation of the network based on the definition of the network, wherein the first graphical representation of the network represents:

a first set of segments of the network;

a first set of attachments of the network, wherein individual attachments of the first set of attachments are assigned to respective segments of the first set of segments; and a first set of routes between two or more attachments of the network.

9. The computer-implemented method of claim 8, wherein generating the second model comprises generating a second graphical representation of the network based on the current deployment of the network, wherein the second graphical representation of the network comprises:

a second set of segments of the network;

a second set of attachments of the network, wherein individual attachments of the second set of attachments are assigned to respective segments of the second set of segments; and a second set of routes between two or more attachments of the network.

10. The computer-implemented method of claim 9, wherein comparing the first model of the network and the second model of the network comprises:

determining whether each route of the first set of routes has a corresponding route in the second set of routes; and determining whether each route of the second set of routes has a corresponding route in the first set of routes.

11. The computer-implemented method of claim 9, wherein comparing the first model of the network and the second model of the network comprises:

determining whether any route of the first set of routes does not have a corresponding route in the second set of routes; and determining whether any route of the second set of routes does not have a corresponding route in the first set of routes.

12. A system comprising:

computer-readable memory storing executable instructions; and one or more processors in communication with the computer-readable memory and programmed by the executable instructions to at least:

generate a first model of a network based on policy data from which the network has been deployed, wherein policy data represents a definition of the network, and wherein the first model is generated without review of the network as deployed;

generate a second model of the network based on a current deployment of the network;

compare the first model of the network and the second model of the network; and based on results of comparing the first model of the network and the second model of the network, generate output representing a discrepancy between the definition of the network and the current deployment of the network.

13. The system of claim 12, wherein the one or more processors are programmed by further executable instructions to:

modify, based on the discrepancy, the definition of the network to generate a modified definition of the network; and modify the current deployment of the network based on the modified definition.

14. The system of claim 12, wherein the one or more processors are programmed by further executable instructions to:

modify, based on the discrepancy, the definition of the network to generate a modified definition of the network; and redeploy the network based on the modified definition.

15. The system of claim 12, wherein the one or more processors are programmed by further executable instructions to modify based on the discrepancy, the current deployment of the network to generate a modified deployment of the network.

16. The system of claim 12, wherein to generate the first model, the one or more processors are programmed by further executable instructions to generate a first graphical representation of the network based on the definition of the network, wherein the first graphical representation of the network represents:

a first set of segments of the network;

a first set of attachments of the network, wherein individual attachments of the first set of attachments are assigned to respective segments of the first set of segments; and a first set of routes between two or more attachments of the network.

17. The system of claim 16, wherein to generate the second model, the one or more processors are programmed by further executable instructions to generate a second graphical representation of the network based on the current deployment of the network, wherein the second graphical representation of the network comprises:

a second set of segments of the network;

a second set of attachments of the network, wherein individual attachments of the second set of attachments are assigned to respective segments of the second set of segments; and a second set of routes between two or more attachments of the network.

18. The system of claim 17, wherein to compare the first model of the network and the second model of the network, the one or more processors are programmed by further executable instructions to:

determine whether each route of the first set of routes has a corresponding route in the second set of routes; and determine whether each route of the second set of routes has a corresponding route in the first set of routes.

19. The system of claim 17, wherein to compare the first model of the network and the second model of the network, the one or more processors are programmed by further executable instructions to:

determine whether any route of the first set of routes does not have a corresponding route in the second set of routes; and determine whether any route of the second set of routes does not have a corresponding route in the first set of routes.

20. The system of claim 12, wherein the one or more processors are programmed by further executable instructions to:

generate a notification of the discrepancy;

receive input in response to the notification; and perform a resolution action based on the input, the resolution action comprising at least one of: redeploying the network, or modifying the policy data.

* * * * *